United States Patent [19]

Stenkvist

[11] 4,204,082
[45] May 20, 1980

[54] DC ARC FURNACE HAVING STARTING ELECTRODE

[75] Inventor: Sven-Einar Stenkvist, Vesteras, Sweden

[73] Assignee: ASEA Aktiebolag, Vesteras, Sweden

[21] Appl. No.: 959,480

[22] Filed: Nov. 13, 1978

[30] Foreign Application Priority Data

Nov. 16, 1977 [SE] Sweden .............................. 7712920

[51] Int. Cl.² ............................................. H05B 7/00
[52] U.S. Cl. ......................................... 13/9 R; 13/35
[58] Field of Search ...................... 13/9, 10, 11, 35, 32

[56] References Cited
U.S. PATENT DOCUMENTS

| 3,383,450 | 5/1968 | Dillon et al. | 13/35 |
| 3,680,163 | 8/1972 | DeCorso | 13/11 |
| 4,024,337 | 5/1977 | Andersson et al. | 13/9 R X |
| 4,119,792 | 10/1978 | Elsner et al. | 13/32 |

Primary Examiner—Roy N. Envall, Jr.
Attorney, Agent, or Firm—Kenyon & Kenyon

[57] ABSTRACT

A DC arc furnace having a melt or hearth electrode requiring contact by molten metal, has starting electrodes built into the furnace side wall above the hearth and which are contacted by steel scrap initially charged in the furnace. These starting electrodes are fixedly positioned and are part of the furnace construction and are used to provide electrical contact with the steel scrap pile charge during the start-up or melt-down phase while the usual arcing electrode, via its arc with the scrap, provides enough heat to form enough melt to contact the melt of hearth electrode. Thereafter, the arcing current commutates from the arcing electrode to the melt or hearth electrode via this initially formed melt, permitting a complete melt-down thereafter. Being permanent parts of the furnace construction, the starting electrodes need never be removed from the furnace.

4 Claims, 2 Drawing Figures

DC ARC FURNACE HAVING STARTING ELECTRODE

BACKGROUND OF THE INVENTION

DC electric arc furnaces currently carry the arcing power to the arc via a melt or hearth electrode or connection, through the charge, the arc, and so to the arcing electrode.

The hearth or melt electrode forms electric connection with the melt in the furnace via a metal bar having an inner end open to the melt and melted by the melt, the electrode projecting through the hearth or an adjacent portion of the hearth and into the melt, the outer unmelted end forming an electrical connection. The construction is such that an electrical connection of adequate current-carrying ability cannot be established via a metal scrap charge; electrical connection can only be established adequately via a melt in the furnace and in contact with the melt or hearth electrode.

Therefore, when a DC arc furnace is being started up, having just been charged with a pile of scrap, it has heretofore been necessary to use a starting electrode which is temporarily pressed against the scrap pieces under adequate pressure to provide an electrical connection having enough current-carrying ability to supply the arc which by its heat initiates melting of the scrap pieces. This starting electrode has, according to the prior art, been thrust against the scrap diagonally via openings in the furnace side wall, or has been inserted through the furnace roof, in both instances requiring special openings through the usual furnace construction and which must be sealed more or less gastightly, while, of course, requiring suitable electrode moving equipment in the form of hydraulically operating reciprocating devices and the like. It has been necessary to temporarily thrust the starting electrode against the initial charge of scrap so as to form a firm electrical contact with the scrap, and after melting has proceeded enough to form a pool of melt contact the melt electrode or connection built somewheres into the hearth, so that this connection becomes operative, to withdraw the starting electrode with the melt-down then proceeding to completion. The Andersson and Stenkvist U.S. Pat. No. 4,081,974 discloses one way to use a starting electrode without requiring special openings through the furnace vessel or its roof and to thereby eliminate the requirement for sealed openings for accommodating the starting electrode. However, this patented arrangement still requires the use of manipulating devices. The disclosure of this patent is hereby made a part of the present disclosure.

SUMMARY OF THE INVENTION

According to the present invention, a DC electric arc furnace is made with what may be a conventional hearth forming a container for the melt ultimately formed and having any of the heretofore known hearth or melt contact arrangements of the type which to be operative must be contacted by an adequate pool or partial melt of molten metal. The hearth, as usual, is electrically non-conductive, so to start the initial melting of scrap piled on the hearth, the previously described type of starting electrode would be normally required.

However, the furnace side wall extending upwardly from the periphery of the hearth, at a position spaced above the melt level, this including slag floating on the melt, is constructed with built-in starting electrodes in the form of vertically extending circumferentially interspaced conducting members, the balance of the side wall being constructed as usual, if desired. These built-in starting electrodes may be made of a refractory compounded to provide electrical conductivity, or they may be in the form of water-cooled plates made of metal and preferably faced inwardly with a layer of refractory having substantial electrical conductivity.

With this new starting electrode arrangement, the scrap can be piled into the furnace and against the furnace side wall and in contact with the built-in starting electrodes. After the furnace is charged adequately with scrap, the arcing electrode can, as usual, be lowered into contact with the scrap and then adjusted so that an arc is struck, it being, of course, assumed that electric power is supplied to the starting electrodes and the arcing electrode.

Because it is possible for these new starting electrodes to be arranged as a pair of diametrically opposed members, the arc initially formed is more or less inherently a vertical arc so that the scrap is heated relatively uniformly in all directions radially from the arc. More than one pair of opposed starting electrodes can be used in a symmetrical arrangement.

After the arc melts enough scrap to form a pool of initial melt forming an adequate electrical connection with what may be the usual hearth or melt electrode, which is to be assumed is in the electric power circuit, the arc will automatically commutate so that the power on the new melt contact electrodes shifts to the melt or hearth connection with melt-down then proceeding to completion.

With this invention, the need for starting electrode passages through the furnace roof or side wall, with their attendant complications, is eliminated as is the requirement for reciprocative power equipment such as must otherwise be used to thrust the conventional starting electrode into contact with the scrap and thereafter withdraw it from the scrap.

Because a multiplicity of the built-in or fixed starting electrodes of the present invention may be used, it is unnecessary that any one of these electrodes have the same high conductivity of the prior art moving starting electrode which can be made of water-cooled copper possibly with a graphite tip. The fixed electrodes of this invention can all be contacted simultaneously by the pile of scrap charged in the furnace, and they can all be interconnected for operation in parallel so that although individually of less electrical conductivity than usual, they collectively have adequate current-carrying capacities to convey the arcing power into the scrap during the initial melting required to make the melt contact electrode adequately operative.

It is academically possible to make the entire furnace side wall electrically conductive, but this would require a substantial departure from conventional DC electric arc furnace designs. The designs of such furnaces are well established and they sometimes include water-cooled metal cooling plates built into the furnace side wall. To practice the present invention, it is only necessary to separately arrange such metal cooling plates in the furnace side wall and with their inner surfaces either directly exposed or possibly protected against the arc radiation by facings of electrically conductive refractory, the plates being symmetrically arranged as previously indicated and, of course, provided with connections to the arcing power. Instead of metal, the symmetrically arranged pairs of diametrically opposed starting electrodes built into as fixed parts of the furnace side wall, may be made of electrically conductive refractory material. For example, almost any of the furnace lining materials conventionally used may be rendered electrically conductive by including in their compounding graphite or the like, and although such electrodes may be of substantially less electrical conductivity than metal, when used as electrically parallel connected pairs of diametrically opposite electrodes, particularly if two or more symmetrically arranged pairs are used, they provide such a multiplicity of conducting paths so as to equal the conductivity of the usual prior art single metal starting electrode.

BRIEF DESCRIPTION OF THE DRAWINGS

The accompanying drawings illustrate entirely schematically the presently preferred mode for carrying out this invention, the various figures being as follows.

DETAILED DESCRIPTION OF THE INVENTION

As a detailed description of the preferred mode for carrying out this invention, reference should be had to the above drawings.

In these drawings the usual vertical arcing electrode is shown at 1, conventionally made in consumable form of carbonaceous material, although it could be otherwise made insofar as the present invention is concerned.

The hearth is shown at 2 and this may be of conventional construction, being formed like a basin so as to hold the entire melt, including slag, for which the furnace is designed.

Figure 1:
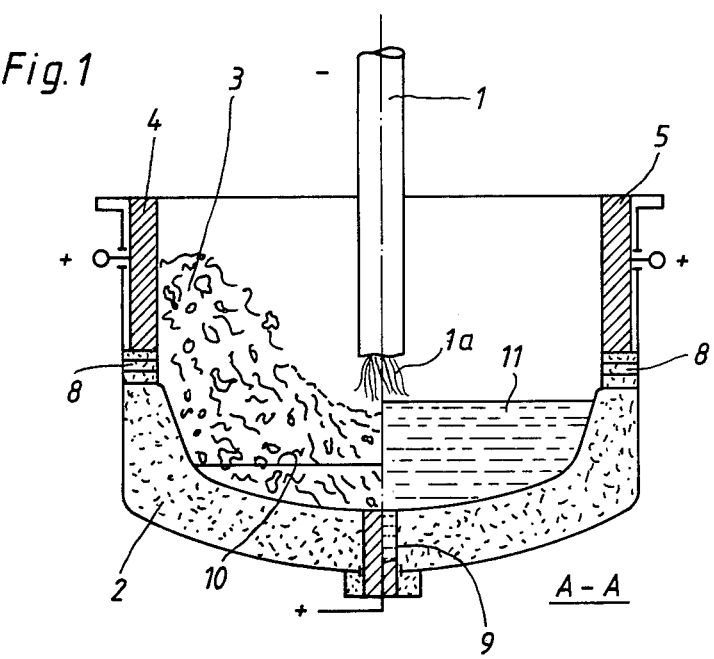
FIG. 1 is a vertical section of an electric furnace vessel taken on the line A—A in FIG. 2, the roof not being shown because it may be entirely conventional excepting for being free of any starting electrode passage or passages, the left-hand side of this figure showing the initially scrap-charged condition and the right-hand side showing the fully melted down condition.
Figure 2:
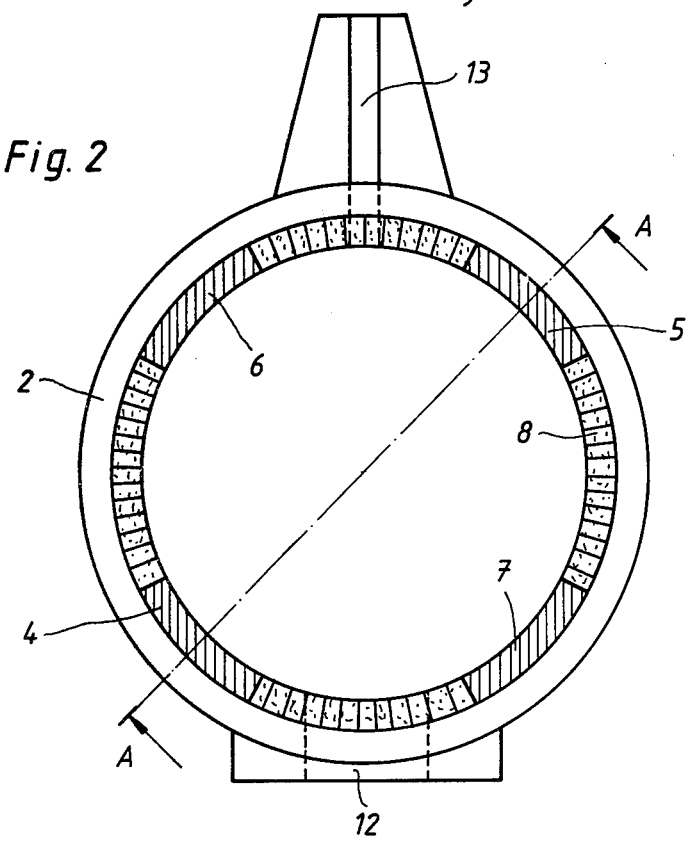
FIG. 2 is a top view of FIG. 1 with the arcing electrode eliminated for clarification.

Referring now to the left-hand side of FIG. 1, the pile of scrap is shown at 3; the furnace is not illustrated as having a roof, but it must be assumed that a roof would be used in the conventional way so that it is removable to permit the charge of scrap to be piled into the furnace and up the furnace side wall 2 which can be seen in FIG. 2. This same FIG. 2 in particular, although FIG. 1 should also be observed, shows the new built-in or fixed starting electrodes 4–5 and 6–7. The starting electrodes 4–5 form one pair of diametrically opposed electrodes, and the electrodes 6–7 form a second pair symmetrically arranged with respect to the first pair and the vertical axis of the furnace. The furnace side wall 2 may, as usual, be made from refractory brick work, which as indicated at 8, supports the weight of the various starting electrodes. In other words, the starting electrodes can be easily supported even if of substantial weight, because of being in the form of vertical water-cooled metal plates, the details of such plates not being shown because they are conventional when used in the form of cooling plates in furnace side walls in general. As previously indicated, if metal plates are used, they can be faced with a refractory of relatively high electrical conductivity, the large number of the fixed starting electrodes permissible in the case of this invention, providing adequate overall electrical conductivity for carrying the starting arcing current.

The new starting electrodes are shown in FIG. 1 as being anodically powered with the arcing electrode operating cathodically as is usual, the arcing electrode normally being operated cathodically in DC arc furnaces.

As previously indicated, the furnace is initially charged with the scrap 3 shown on the left-hand side in FIG. 1, the scrap pile extending to the center of the furnace beneath the arcing electrode 1 and normally being piled around this center as uniformly as possible. The scrap should be piled high enough to reach above the hearth 2 and lie against the fixed or built-in starting electrodes previously described.

FIG. 1 illustrates schematically a conventional melt or hearth electrode 9, and when the scrap is initially charged, it can be seen that on the left-hand side of FIG. 1, the melt contact electrode comprises a solid metal bar of limited contact area and on which the scrap rests by gravity only. For a cathodic arcing electrode, this melt contact 9 is, of course, anodically powered and the starting electrodes may be in direct electrical circuit with this melt contact electrode. The latter, however, has insufficient electrical contact with the scrap to effectively carry arcing current, this being put into the scrap via the multiplicity of fixed or built-in contact electrodes 4–5 and 6–7.

Assuming all components are in electric circuit with a suitable arcing power source, the arcing electrode 1 is lowered into contact with the scrap 5 and then raised to strike an arc schematically shown at 1a, the power circuit being via the vertically extending starting electrodes above the brick work 8 and above the hearth 2. As the initial phase of melt-down proceeds, a pool of melt forms with a level enough above the melt bottom and the melt contact part 9 to provide an adequate electrical contact with the latter, the melt level of this initially formed pool being indicated at 10. At this time the arcing power automatically commutates from the starting electrodes to the melt contact electrode 9, the inner end of the latter at this time acquiring its molten phase as is usual. With complete melt-down, and perhaps the use of more scrap, the operating melt level 11, for which the furnace is designed, is ultimately obtained.

During the working of the melt 11 in the furnace, the various fixed or built-in starting electrodes remain immovably in position. They do not interfere with normal metallurigical working of the melt. Assuming the furnace is as usual a tilting furnace, as suggested by the slag tap hole 12 and pouring spout 13, illustrated in FIG. 2, the new starting electrode cannot possibly cause any interference during slag tapping and ultimately melt pouring.

There is no need for a roof-mounted starting electrode or for starting electrode openings in the furnace side wall. Although the starting electrode arrangement used by the previously mentioned Andersson and Stenkvist patent, eliminates special roof or side wall openings for accommodating the starting electrode, that patented arrangement still involves an external power-operated working mechanism for the starting electrode, eliminated by the present invention.

As can be seen from FIG. 1, the high pressure contact with the scrap used in the case of the conventional starting electrode pressed forcibly against the scrap, is not involved by the present invention. The scrap merely gravitationally rests against the new fixed starting electrodes. However, there can be a large number of these electrodes such as a pair of two, a second pair of two symmetrically arranged with respect to the first and so on, although the four electrodes illustrated are considered to be adequate. It follows that as compared to the gravitational contact of the scrap with the melt contact or hearth electrode 9, known to be inadequate, there is a vastly larger contact area between the new starting electrodes and the scrap pile, the accumulative effect of which is completely adequate to carry the arcing power into the scrap pile and so via the arc to the arcing electrode. Each of the new starting electrodes can follow the contour of and be in effect a part of the furnace side wall. As previously indicated, it can be made of metal and faced with a conductive refractory such as one obtained by a mixture of magnesium oxide and graphite. This can be made adequately thick to protect the metal from the arc flare while still providing the electrical conductivity required when it is considered that the new starting electrodes are used in multiple. FIG. 1 shows the starting electrodes 4 and 5 and the melt contact 9 anodically powered, and it is to be understood that anodic power connections are made to the starting electrode 6 and 7, although not illustrated. The same anodic power can be applied to all of these simultaneously.

As illustrated, the starting electrodes are preferably curved transversely to match the curvature of the furnace wall of which they are a fixed part. Their bottoms are shown as well above the normal melt level. The curved insides of the electrodes are flush with the balance of the furnace side wall which is electrically nonconductive.

What is claimed is:

1. A DC arc furnace comprising a furnace vessel having a hearth adapted to contain a melt and a side wall extending upwardly from said hearth, an arcing electrode positioned above said hearth, said hearth having a hearth electrode requiring contact by molten metal to be effective, and starting electrode means for contacting scrap charged in said vessel to put arcing current in the scrap until said molten metal is formed, said means comprising a plurality of elongated, electrically conductive plate-like elements built into said side wall and forming fixed immovable parts thereof, said elements being circumferentially interspaced and being vertically positioned so that scrap initially charged in said vessel gravitationally leans against the elements and solely thereby forms electrical connection therewith, said arcing electrode being connected for operation with one polarity and said hearth electrode and said elements being connected for operation with the opposite polarity, said electrical connection of any one of said elements being insufficient to put said arcing current in the scrap and the elements being provided in sufficient number to cumulatively put the arcing current into the scrap.

2. The furnace of claim 1 in which said elements are positioned diametrically opposite to each other and are electrically interconnected in parallel.

3. The furnace of claim 2 in which said elements comprise water-cooled metal plates and said side wall is made from refractory bricks of which a portion are below said elements and support the weight of the elements.

4. The furnace of claim 3 in which said portion positions said elements above the normal working melt level of said hearth.

* * * * *